United States Patent [19]

Kolpak

[11] Patent Number: 5,090,253

[45] Date of Patent: Feb. 25, 1992

[54] CORIOLIS TYPE FLUID FLOWMETER

[75] Inventor: Miroslav M. Kolpak, Plano, Tex.

[73] Assignee: Atlantic Richfield Company, Los Angeles, Calif.

[21] Appl. No.: 523,152

[22] Filed: May 14, 1990

[51] Int. Cl.$^5$ .............................................. G01F 1/84
[52] U.S. Cl. ............................................ 73/861.38
[58] Field of Search ........................ 73/861.37, 861.38

[56] References Cited

U.S. PATENT DOCUMENTS

| | | |
|---|---|---|
| 2,821,084 | 1/1958 | Altfillish et al. .................. 73/861.38 |
| 3,396,579 | 8/1968 | Souriau ............................. 73/861.38 |
| 4,252,028 | 2/1981 | Smith et al. ...................... 73/861.38 |
| 4,729,243 | 3/1988 | Friedland et al. ................ 73/861.38 |

FOREIGN PATENT DOCUMENTS

| | | | |
|---|---|---|---|
| 0119638 | 9/1984 | European Pat. Off. .......... | 73/861.37 |
| 0290325 | 12/1986 | Japan ................................ | 73/861.38 |

*Primary Examiner*—Herbert Goldstein
*Attorney, Agent, or Firm*—Michael E. Martin

[57] ABSTRACT

A coriolis type flowmeter has separate sets or bundles of tubes which are interconnected with each other to vibrate laterally with respect to the direction of flow through the tubes by a vibrator mechanism and which vibrations are sensed by spaced apart sensor devices for determining the vibrational characteristics and the related mass flow rate and mass density of fluid flowing through the tube bundles. In one embodiment the flowmeter inlet and outlet manifolds are formed with split conduit portions for directing the flow of fluid to and from the respective tube bundles. In another embodiment, the inlet and outlet manifolds are arranged for parallel lateral flow of fluid to and from the manifolds and the respective sets of flow tubes are spaced apart along the manifolds and arranged in alternating sets interconnected by tie rods at the respective vibrator mechanisms and sensors.

5 Claims, 2 Drawing Sheets

CORIOLIS TYPE FLUID FLOWMETER

BACKGROUND OF THE INVENTION

1. Field of the Invention

This invention relates to a Coriolis type mass flowmeter, particularly useful for multi-phase fluid flow wherein the flowmeter includes plural tube bundles which are curved or formed in a somewhat U-shape to improve the meter accuracy.

2. Background

The measurement of flow rates of multi-phase fluids, that is, for example, mixtures of water, oil and gas, is particularly difficult for conventional metering devices. Coriolis type flowmeters have certain advantages in fluid flow measuring applications but known types of Coriolis flowmeters require considerable correction for measurement errors when measuring multi-phase fluids or so-called gassy liquids which are common in oil production operations, for example.

Conventional Coriolis type flowmeters usually comprise a pair of tubes which are formed in a U-shaped, curved or straight configuration and into which the fluid flowstream to be measured is split. The tubes are vibrated by one or more inductive coils and the Coriolis force acting on the meter causes distortion of the forced vibration and a phase difference to occur between the upstream and downstream end of the meter tubes, which phase difference is proportional to mass flow. The relationship between the natural period of vibration of the tubes and the mass density of fluid flowing through the tubes, as well as the relationship between mass flow rate and phase difference as applied to Coriolis type flowmeters is known to those skilled in the art and will not be explained in further detail herein.

In order to utilize the Coriolis type meter in large scale high-flow applications increasing the tube diameter results in higher error sensitivities and, it is indicated, less tolerance for through-put of gassy or multi-phase fluid flow. Moreover, it is indicated that the overall tolerance of the meter for gas in the liquid being measured tends to be inversely proportional to the tube diameter. For example, a Coriolis type flowmeter having 0.25 inch diameter tubes may function well in measuring flow having as much as twenty percent entrained gas whereas a meter having 1.0 inch diameter tubes will tolerate fluid having only about five percent gas in order to maintain the same measurement accuracy. Beyond the tolerance limits, Coriolis type meters cease to function since the presence of gas dampens the harmonic vibrations of the tubes.

Canadian Patent 1,205,653 to C. J. M. Wolff and assigned to Shell Canada Ltd. describes a Coriolis type flowmeter having two or more straight parallel vibrating tubes. These tubes are bundled together with support members and an inductive coil or other vibrating device is interposed at approximately the midpoint of the meter tube bundle to vibrate the tube bundle at or near its resonant frequency. However, the amount of vibration inducible in a straight tube bundle is limited and certain errors in measuring the phase difference between the vibrations at the inlet and discharge ends of the tube bundle may be experienced. The deficiencies of prior art Coriolis type flowmeters are, however, overcome by the improved meter of the present invention.

SUMMARY OF THE INVENTION

The present invention provides an improved Coriolis type fluid flowmeter characterized by an arrangement of separate bundles of tubes which are interconnected with each other and are curved or otherwise change direction to exhibit more sensitivity to changes in fluid flow rates.

In accordance with one aspect of the present invention, there is provided an arrangement of plural tube bundles which are arranged in a configuration so that tube displacement is easily measured and differences between displacement or phase of vibration of the tube bundles is enhanced without reducing measurement sensitivity and while accommodating higher fluid pressures and reduced friction pressure losses.

In one embodiment of the present invention, a dual array or bundle of curved tubes is provided and which is vibrated at its midpoint by a vibrator mechanism and wherein the displacement of the tube bundles is measured by separate sensors and the movement of the upstream and downstream portions of the tube bundles are compared to determine fluid flow rates.

In another embodiment of the invention, an arrangement of separate groups of curved tubes is provided which are connected at their opposite ends to manifold members and wherein alternate ones of the tubes are interconnected mechanically for induced vibration at the midpoint of the tube group or bundle and for measurement of the displacement or phase difference of vibration of the respective tube bundles at upstream and downstream points, respectively.

The present invention provides certain advantages in Coriolis type fluid flowmeters including a higher tolerance of gas entrained in a liquid whose flow rate is being measured without losing meter sensitivity and the ability to handle higher flow rates without reduction in measurement accuracy. Still further, the improved arrangements of the present invention permit higher operating pressures and minimal fluid pressure losses than prior art Coriolis type flowmeters.

The above-noted features and advantages of the present invention together with other superior aspects thereof will be further appreciated by those skilled in the art upon reading the detailed description which follows in conjunction with the drawing.

DESCRIPTION OF PREFERRED EMBODIMENTS

Figures 1, 2:
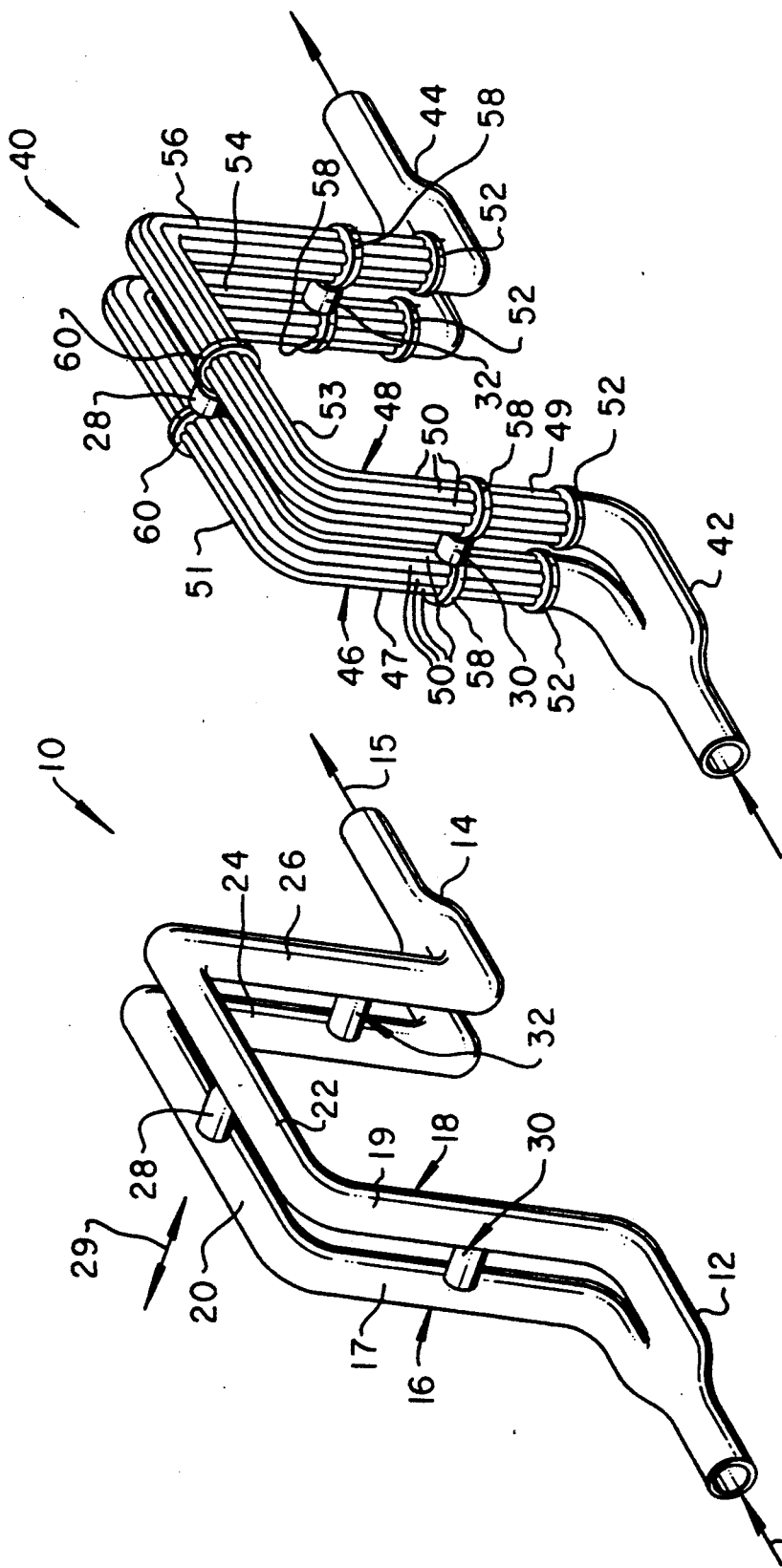
FIG. 1 is a perspective view in somewhat schematic form of a prior art Coriolis type flowmeter.
FIG. 2 is a perspective view in somewhat schematic form of one embodiment of an improved flowmeter in accordance present invention.

In the description which follows, like parts are marked throughout the specification and drawing with the same reference numerals, respectively. The drawing figures are not to scale and certain features are shown in schematic form in the interest of clarity and conciseness.

Referring to FIG. 1 there is illustrated a conventional Coriolis type flowmeter generally designated by the numeral 10. The flowmeter 10 is characterized by an inlet manifold member 12 and an outlet manifold member 14 and which are interconnected by a pair of flow tubes 16 18 which change direction between the manifold members 12 and 14 as indicated by the vertically disposed runs 17 and 19 which turn at right angles to generally horizontally disposed runs 20 and 22 which, in turn, change direction to a second set of vertically disposed runs 24 and 26. The particular arrangement thus forms a somewhat C-shaped or inverted U-shaped pair of tubes 16 and 18 which are spaced apart sufficiently to provide for having interposed therebetween a vibrator mechanism 28.

The mechanism 28 induces lateral or transverse vibrations in the tubes 16 and 18 in the direction of the arrows 29, which is normal to the direction of flow of fluid through the manifolds 12 and 14 as indicated by the arrows 13 and 15. The flowmeter 10 also includes spaced apart sensors 30 and 32 which measure the lateral displacement or "twist" of the respective tube runs 17, 19 and 24, 26, respectively. Accordingly, when fluid is flowing into the flowmeter 10 through the manifold 12, the fluid enters the tubes 16 and 18 in substantially equal amounts of flow, changes direction with respect to the manifold 12 upon entering the vertical runs 17 and 19, changes direction again while flowing through the horizontal runs 20 and 22, changes direction yet again while flowing through the vertical runs 24 and 26 and, finally, exits the meter through the manifold 14.

In response to vibration of the tubes 16 and 18 by the vibrator mechanism 28 at a predetermined frequency, which may be varied, the displacement of the tube runs 17, 19 and 24, 26 are compared and the phase relationship of vibrations of these respective sets of tube runs are measured and such phase relationship is a function of the fluid mass flow rate. The principle of operation of a Coriolis type flowmeter is known to those skilled in the art and will not be further discussed herein in the interest of clarity and conciseness.

In order to accommodate higher flow rates, particularly of multi-phase fluids or gassy liquids, the increase in diameter of the flow tubes 16, 18, for example, above about 1.0 inches nominal diameter indicates a tolerance for gas flows in the amount of only about five percent of total mass flow rate whereas in accordance with tests and calculations I have made, a tube diameter of about 0.25 inches will operate with acceptable error with as much as twenty percent entrained gas mass flow rate. Accordingly, by providing a flowmeter having a bundle or array of smaller diameter tubes which are suitably interconnected, higher flow rates of gassy liquids may be measured with acceptable accuracy and with minimal pressure drop across the flowmeter by providing an arrangement illustrated in FIG. 2.

Referring to FIG. 2, one embodiment of the present invention comprises a Coriolis type mass flowmeter 40 having a fluid inlet manifold 42 and a fluid outlet manifold 44 which are interconnected by separate sets or bundles of tubes 46 and 48. The tube bundles 46 and 48 are made up of individual flow tubes 50 which are bundled in a generally cylindrical array and secured at their opposite ends to the manifolds 42 and 44 by suitable flanges 52. The tube bundles 46 and 48 have a generally vertical run 47 and 49, respectively, formed integral with a generally horizontal run 51 and 53 and a second generally vertical run 54 and 56, respectively. Each of the vertical runs 47 and 49 include tube interconnecting means comprising a flange 58 and in like manner, the vertical runs 54 and 56 also include spaced apart flanges 58 which journal the respective tubes 50 of the bundles 46 and 48. At approximately the midpoint of the horizontal tube bundle runs 51 and 53, spaced apart flanges 60 are provided and are engaged with the vibrator mechanism 28. In like manner, sensors 30 and 32 are provided and interposed between the respective sets of flanges 58 which are associated with the respective tube runs 47, 49 and 54, 56.

The operation of the meter 40 is similar to that of the prior art meter 10 in that vibration of the tube bundles 46 and 48 at a selected frequency is carried out by the vibrator mechanism 28 and the vibratory response of the vertical runs 47, 49 and 54, 56, measured by the sensors 30 and 32, is compared to determine the phase relationship and compare this to a known phase relationship for a given fluid mass flow rate.

The change in direction of the tube bundles 46 and 48 need not necessarily be from vertical to horizontal and back to vertical, nor continuously curved. As long as the tube bundles are configured to change direction between the inlet and outlet manifolds or conduit portions leading to and from the tube bundles, greater meter sensitivity is possible than with straight tube bundles.

Figure 3:
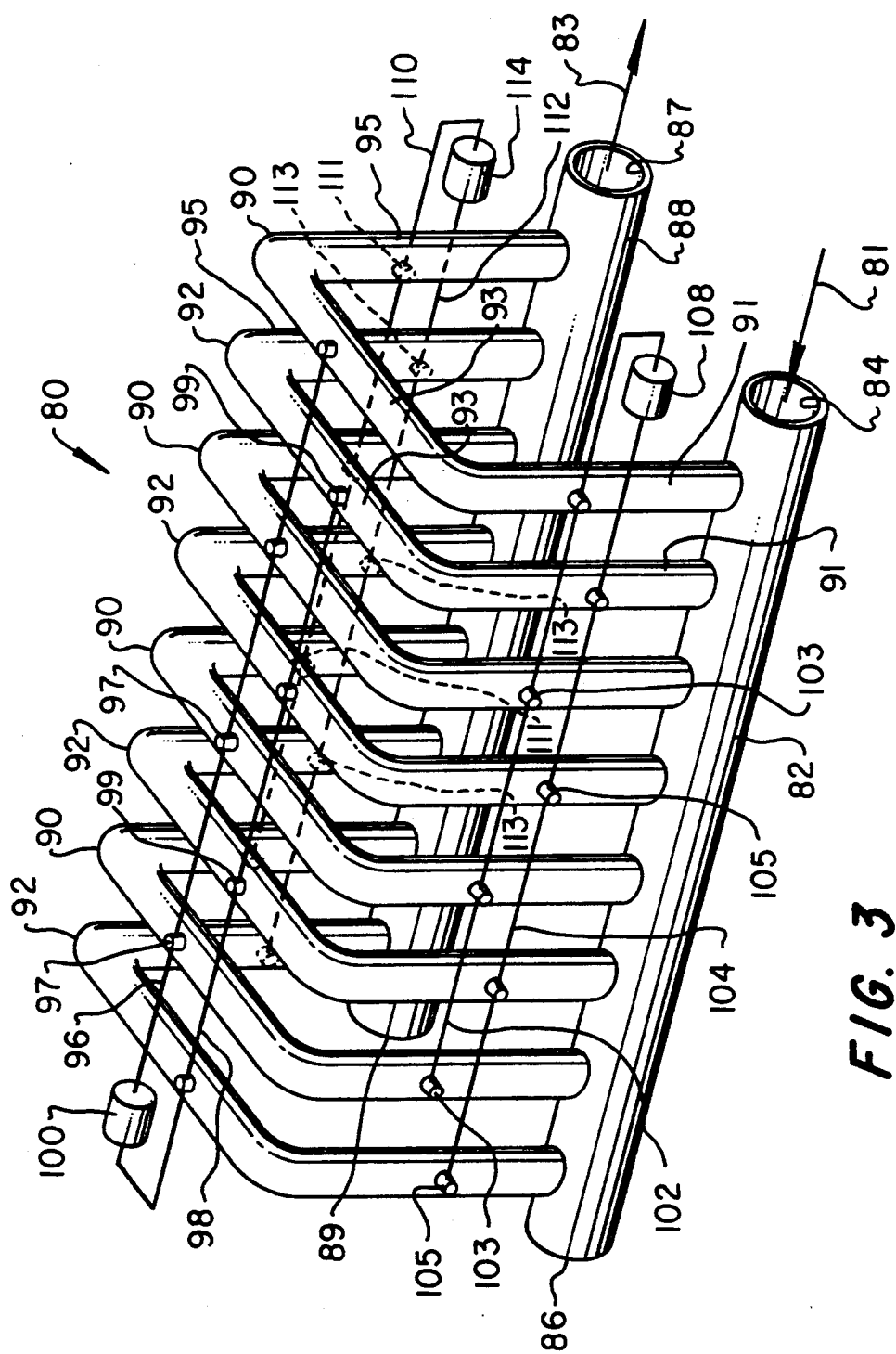
FIG. 3 is a perspective view in somewhat schematic form of an alternate embodiment of a flowmeter in accordance with the present invention.

Looking now at FIG. 3, there is illustrated an alternate embodiment of the present invention comprising a Coriolis type flowmeter, generally designated by the numeral 80. The flowmeter 80 has an inlet manifold 82 comprising a generally elongated tube having an inlet opening 84 at one end and being closed at its opposite end 86. In like manner, the flowmeter 80 includes a discharge manifold 88 having a closed end 89 and an outlet opening at its opposite end 87. Both the manifolds 82 and 88 are of generally cylindrical pipe configuration although they may be of other cross sectional configurations. The fluid flow may enter and exit the manifolds at points other than the ends thereof. By way of example, the direction of flow to and from the meter 80 is as indicated by the arrows 81 and 83, respectively. The manifolds 82 and 88 are interconnected by respective sets of spaced apart fluid conducting tubes 90 and 92.

Each of the tubes 90 and 92 has a first generally vertical run 91, for example, a generally horizontal run 93 and a second generally vertical run 95. Fluid entering the manifold 82 flows through the tubes 90 and 92 and then to the manifold 88. Each of the tubes 90 is interconnected with the other tubes 90 generally at the midpoint of the horizontal runs 93 by an elongated tie rod 96 secured at points 97, respectively, by suitable means. In like manner, each of the tubes 92 is connected to an elongated tie rod 98 at suitable connection means 99, respectively. The rods 96 and 98 are interconnected to a vibrator mechanism 100 whereby the respective sets of tubes 90 and 92 may be vibrated at a selected frequency in opposite directions with respect to each other in a manner similar to the manner in which the tubes and tube bundles of the flowmeters 10 and 40 are vibrated.

Referring further to FIG. 3, the inlet vertical runs 91 of the tubes 90 and 92 are also, respectively, interconnected by tie rods 102 and 104 which are secured to the respective sets of tubes 90 at connection means 103 and 105. The tie rods 102 and 104 are connected to a displacement sensor 108 to indicate the lateral displacement of the tubes 90 with respect to the tubes 92 along the vertical runs 91. In like manner, the tubes 90 are also interconnected along their respective vertical runs 95 by a tie rod 110 secured to the respective tubes at connection means 111 and the tubes 92 are interconnected by a tie rod 112 secured to each of the vertical runs 95 by connection means 113. The tie rods 110 and 112 are also connected to a sensor 114 for sensing the lateral displacement of the tubes 90 with respect to the tubes 92 along their vertical fluid discharge runs 95.

The operation of the flowmeter 80 is similar to the operation of the flowmeters 10 and 40. The respective sets of tubes 90 and 92 are vibrated with respect to each other by the vibrator mechanism 100 which is disposed to effect vibration at substantially the midpoint of the tubes 90 and 92 between their points of connection to the manifolds 82 and 88. The phase relationship between the displacement of the tube runs 91 and 95 is sensed by the sensors 108 and 114 and compared to determine the mass flow rate of fluid through the meter 80.

Thanks to the arrangement of the plural tubes 90 and 92, a substantially higher flow rate of gassy liquid may be conducted through the meter 80 without introducing measurement errors than is possible with a meter having a single pair of flow tubes. As with the flowmeter 40, the configuration of the tubes 90 and 92 need not be that which provides for merely a straight vertical run, a generally horizontal run and a second generally straight vertical run but other curved or directional change geometries may be employed as long as the considerations of locating the vibrator mechanism at substantially the midpoint of the tubes between their connection to the manifolds is carried out and the point of measurement of the displacement of the sets of tubes by the sensors 108 and 114 is at a point substantially equidistant from the points of connection of the vibrator 100.

Although preferred embodiments of an improved Coriolis type flowmeter have been described herein, those skilled in the art will recognize that various substitutions and modifications may be made to the embodiments disclosed without departing from the scope and spirit of the invention as recited in the appended claims.

What is claimed is:

1. A Coriolis type flowmeter for measuring the flow rate of a fluid comprising a gassy liquid, said flowmeter comprising:

an inlet manifold and a discharge manifold, each of said manifolds being configured to be connected to a plurality of fluid flow conducting tubes of a first set and a second set, respectively;

a first set of fluid flow conducting tubes interconnecting said manifolds, said first set of tubes being configured to change the direction of flow of fluid through said first set between said manifolds;

a second set of fluid flow conducting tubes interconnecting said manifolds and being of a configuration similar to said first set of tubes and being spaced from said first set of tubes for conducting fluid through a change in direction of flow between said manifolds;

said first and second sets of tubes are arranged spaced apart from each other such that alternate ones of said tubes are of said first set and said second set, respectively, said tubes of said first set are connected to tie means interconnecting said tubes of said first set with each other and said tubes of said second set are connected to tie means interconnecting said tubes of said second set with each other;

vibrator means operably engaged with said first set of tubes and said second set of tubes for vibrating said tubes generally laterally with respect to the direction of flow of fluid through said tubes; and first and second sensor means operably connected to said first and second sets of tubes for sensing the vibration of said sets of tubes at a point upstream with respect to the direction of flow of fluid through said tubes from said vibrator means and at a point downstream with respect to the direction of flow of fluid through said tubes from said vibrator means, respectively.

2. The flowmeter set forth in claim 1 wherein:

said vibrator means is interconnected with said tie means for vibrating said first set and said second sets of tubes with respect to each other and laterally with respect to the direction of flow of fluid through said sets of tubes.

3. A Coriolis type flowmeter for measuring the flow rate of a liquid comprising:

an inlet manifold member and a discharge manifold member;

a first set of flow conducting tubes interconnecting said manifold members, said first set of tubes being configured such as to change the direction of flow of fluid through said first set between said manifold members;

a second set of fluid conducting tubes interconnecting said manifold members and being configured to change the direction of flow of fluid through said second set between said manifold members;

said tubes of said first set and said second set being arranged spaced apart from each other and such that alternate ones of said tubes are of said first set and said second set, respectively;

vibrator tie means interconnecting said first set of tubes at a point substantially midway between said manifold members and vibrator tie means interconnecting said second set of tubes with each other at a point substantially midway between said manifold members;

vibrator means interconnected between said vibrator tie means for vibrating said first set of tubes and said second set of tubes with respect to each other and generally laterally with respect to the direction of flow of fluid through said sets of tubes;

first sensor tie means interconnecting said first and second sets of tubes, respectively, at a point spaced from said vibrator tie means and upstream of said vibrator tie means with respect to the direction of flow of fluid through said sets of tubes, and second sensor tie means interconnecting said tubes of said first and second sets of tubes, respectively, at a point downstream of said vibrator tie means with respect to the direction of flow of fluid through said tubes; and first and second sensor means operably connected to the sensor tie means of said first set and said second set of tubes, respectively, for sensing the lateral vibration of said first set of tubes and said second set of tubes at said points upstream and downstream, respectively.

4. The flowmeter set forth in claim 3 wherein:

the configuration of said sets of tubes is such as to substantially reverse the direction of flow of fluid through said tubes between said manifold members.

5. The flowmeter set forth in claim 4 wherein:

said sets of tubes have a first run, a second run generally normal to said first run, and a third run generally normal to said second run formed between said manifold members.

* * * * *